US009550562B2

(12) United States Patent
Constans et al.

(10) Patent No.: US 9,550,562 B2
(45) Date of Patent: Jan. 24, 2017

(54) SYSTEM AND METHOD FOR CONTROLLING AN AIRCRAFT

(71) Applicant: Airbus Operations S.A.S., Toulouse (FR)

(72) Inventors: Florian Constans, Pibrac (FR); Josep Boada-Bauxell, Toulouse (FR); Pierre Scacchi, Toulouse (FR)

(73) Assignee: Airbus Operations S.A.S. (FR)

( * ) Notice: Subject to any disclaimer, the term of this patent is extended or adjusted under 35 U.S.C. 154(b) by 247 days.

(21) Appl. No.: 14/283,290

(22) Filed: May 21, 2014

(65) Prior Publication Data
US 2014/0346280 A1 Nov. 27, 2014

(30) Foreign Application Priority Data

May 23, 2013 (FR) ..................... 13 54656

(51) Int. Cl.
*B64C 13/18* (2006.01)
*B64C 19/00* (2006.01)
(Continued)

(52) U.S. Cl.
CPC ............ *B64C 19/00* (2013.01); *B64D 31/04* (2013.01); *B64C 13/04* (2013.01); *B64C 13/16* (2013.01); *B64D 31/06* (2013.01)

(58) Field of Classification Search
CPC .......... B64C 19/00; B64C 13/04; B64C 13/16; B64C 13/00; B64C 13/30; B64D 31/04; B64D 31/06; G05D 1/0202; G05D 1/0061
(Continued)

(56) References Cited

U.S. PATENT DOCUMENTS 1,909,182 A * 5/1933 Lanagan ............... G05G 23/00
244/234
2,957,687 A * 10/1960 Chillson .............. B64C 13/30
123/376
(Continued)

FOREIGN PATENT DOCUMENTS

GB 691017 A * 5/1953 ........... G05D 1/0061
GB 2 482 408 A 2/2012

OTHER PUBLICATIONS

French Search Report (FR 13 54656) (Feb. 6, 2014).

*Primary Examiner* — Brian M O'Hara
*Assistant Examiner* — Assres H Woldemaryam
(74) *Attorney, Agent, or Firm* — Lerner, David, Littenberg, Krumholz & Mentlik, LLP

(57) ABSTRACT

A system for controlling an aircraft control parameter including a control interface including a mobile element configured to move on a travel, of which at least two portions are separated by a neutral position; a return element bringing the mobile element back to the neutral position when it is not actuated; and an interaction element, and a control unit configured to memorize an item of information corresponding to a first position of the mobile element at an instant of activation of the interaction element; and generate a setpoint of the aircraft control parameter, as a function of a control associated with the first position of the mobile element for which said information has been memorized; or a current position of the mobile element, when this current position is situated on the same portion of travel as the first position and is more remote than the latter from the neutral position.

13 Claims, 3 Drawing Sheets

(51) Int. Cl.
  *B64D 31/04*  (2006.01)
  *B64C 13/04*  (2006.01)
  *B64C 13/16*  (2006.01)
  *B64D 31/06*  (2006.01)

(58) Field of Classification Search
  USPC ....... 244/175, 221, 220, 192, 222, 224, 227, 244/228; 701/3, 99, 14, 48, 51
  See application file for complete search history.

(56) References Cited

U.S. PATENT DOCUMENTS

| | | | | |
|---|---|---|---|---|
| 3,043,159 A | * | 7/1962 | Morse | B63H 21/213 477/112 |
| 4,043,526 A | * | 8/1977 | Donley | G05D 1/0077 244/194 |
| 4,567,786 A | * | 2/1986 | Sakurai | B64D 31/04 244/220 |
| 4,651,954 A | * | 3/1987 | Miller | B64D 31/06 244/234 |
| 5,029,778 A | * | 7/1991 | DeLuca | B64D 31/02 244/175 |
| 5,868,359 A | | 2/1999 | Cartmell et al. | |
| 5,984,241 A | * | 11/1999 | Sparks | B64D 31/04 244/110 B |
| 6,038,498 A | * | 3/2000 | Briffe | G01C 23/00 244/1 R |
| 6,644,600 B1 | * | 11/2003 | Olson | B64C 13/04 244/221 |
| 7,361,067 B1 | * | 4/2008 | Smedema | B63B 35/815 440/1 |
| 8,074,940 B2 | * | 12/2011 | Kopp | B64C 13/04 244/221 |
| 8,123,177 B2 | * | 2/2012 | Kummle | B64C 13/04 244/236 |
| 8,223,039 B2 | * | 7/2012 | Campagne | B64D 31/04 340/945 |
| 8,272,599 B2 | * | 9/2012 | Haverdings | B64C 13/04 244/221 |
| 8,480,037 B2 | * | 7/2013 | Belkadi | B64D 31/02 244/228 |
| 2003/0176256 A1 | | 9/2003 | Kamichi et al. | |
| 2009/0187292 A1 | | 7/2009 | Hreha et al. | |
| 2009/0312918 A1 | * | 12/2009 | Aubert Sol-Morales | B60K 20/02 701/48 |
| 2010/0042267 A1 | * | 2/2010 | Goodman | B64D 31/04 701/3 |
| 2010/0070112 A1 | * | 3/2010 | Couey | F02C 9/28 701/3 |
| 2010/0241332 A1 | * | 9/2010 | Andrieu | B64D 31/04 701/100 |
| 2013/0190949 A1 | * | 7/2013 | Constans | B64D 31/02 701/3 |
| 2014/0061389 A1 | * | 3/2014 | Elabellaoui | B64D 31/04 244/224 |
| 2014/0157943 A1 | * | 6/2014 | John | G05G 5/06 74/526 |

\* cited by examiner

SYSTEM AND METHOD FOR CONTROLLING AN AIRCRAFT

TECHNICAL FIELD

The present invention concerns a system and a method for controlling an aircraft control parameter. Modern aircraft, particularly transport airplanes, include interfaces allowing a pilot to control certain control parameters of the aircraft, such as the thrust of the engines or the angles of roll or pitch. Thus, a throttle is provided for the control of the thrust of the engines; a joystick or a mini joystick is provided for the lateral (roll angle) and longitudinal (pitch angle) control of the aircraft.

BACKGROUND OF THE INVENTION

There are typically two types of throttle for the control of the thrust of the engines. A first type corresponds to a motorized throttle, the position of which can be controlled manually by a pilot of the aircraft in manual piloting; the position of the throttle can also be controlled by a servomotor in a mode of automatic control of the throttle (autothrottle). The benefit of such a throttle resides in the fact that the position of the throttle always corresponds to the controlled thrust of the engines of the aircraft, whether in manual control mode or in automatic control mode. However, the presence of a servomotor makes the throttle complex, which can leave it vulnerable to malfunctions. It is therefore necessary to put in place mechanisms of disengagement or override, as well as redundancy in order to guarantee the availability and safety objectives required. A second type corresponds to an automatic control of the thrust (autothrust): the position of the throttle can only be controlled manually by a pilot of the aircraft. The position of such a throttle is therefore only representative of the aircraft engine thrust in manual piloting mode. In an autothrust control mode, the position of such a throttle is not representative of the engine thrust. Such a throttle is not complex and therefore exhibits a high level of reliability. Nonetheless, a pilot may need to adjust the position of the throttle in the event of a transition between an autothrust mode and a manual thrust control mode in order to avoid abrupt transitions of the level of thrust of the engines of the aircraft, which could have consequences for the comfort of the passengers. Moreover, a throttle is generally associated with each of the aircraft engines. A pilot of the aircraft must therefore handle as many throttles as the aircraft has engines.

BRIEF SUMMARY OF THE INVENTION

The subject of the present invention is the palliation of the aforementioned drawbacks. It concerns a system for controlling an aircraft control parameter, said control system comprising a control interface, which includes:
  a mobile element configured to move on a travel, said travel defining at least two portions of travel separated by a neutral position;
  a return element configured to bring the mobile element back to said neutral position when said mobile element is not actuated; and
  an interaction element.
This control system is noteworthy in that it also comprises a control unit configured to:
  memorize an item of information corresponding to a first position of the mobile element at an instant of activation of the interaction element; and
  generate a setpoint of said aircraft control parameter, said setpoint being generated as a function of a control associated with:
    said first position of the mobile element for which said information has been memorized at said instant of activation of the interaction element; or
    a current position of the mobile element, when this current position and the first position are situated on the same portion of travel and this current position is more remote from the neutral position than the first position is remote from the neutral position.

This system therefore allows an automatic return of the mobile element to the neutral position when the mobile element is not being handled by an operator, while continuing to provide a setpoint of the aircraft control parameter, said setpoint thus corresponding to the first position of the mobile element for which said item of information has been memorized on activation of the interaction element. Thus, apart from when it is being handled by a member of the crew, the mobile element is always in the neutral position. As a consequence, this neutral position of the mobile element remains consistent with a current control value of the aircraft control parameter, even in a mode of automatic control of the aircraft control parameter, without it being necessary to provide a servomotor for moving the mobile element.

In a particular embodiment, said control parameter is consistent with the derivative of the aircraft energy. This makes it possible to control a variation of the aircraft energy, and therefore the aircraft energy. This variation of the energy can correspond to an increase or to a decrease in the aircraft energy. The fact of controlling an increase in the aircraft energy rather than the individual thrust of each of the engines offers the advantage of simplifying the piloting of the aircraft since it is not necessary to actuate a throttle for each of the engines, but said mobile element only. Moreover, it is also possible to control, with this single mobile element, actuators making it possible to decrease the aircraft energy, such as airbrakes or brakes.

Advantageously, said at least two portions of travel are associated with at least two combinations of actuators acting on the aircraft energy. A system in accordance with this particular embodiment therefore makes it possible to control several actuators simultaneously, with said mobile element only.

Preferably, the control system furthermore comprises a display device and the control unit is configured to control the display, on this display device, of at least a first indication corresponding to the current position of the mobile element and of a second indication corresponding to the first position of the mobile element. Advantageously, the control unit is configured to control, furthermore, the display on the display device of a third indication corresponding to a current value of the aircraft control parameter, this third indication being displayed relative to said first and second indications. This makes it possible to supply a pilot of the aircraft with information making it possible to improve his awareness of the situation: the pilot can thus know whether the control parameter setpoint, generated by the system, corresponds to the current position or to the first position. He can thus determine more easily what actions he must perform.

Advantageously, the memorized information corresponding to the first position of the mobile element at an instant of activation of the interaction element is:
  a value representing said first position; or
  a setpoint value of the aircraft control parameter generated as a function of a control associated with said first position of the mobile element.

In an embodiment, the interaction element can furthermore be configured to block the mobile element in position.

The invention also concerns an aircraft piloting system including an aircraft autopilot device as well as a control system as mentioned previously, said piloting system being able to be configured at least according to:
- a first mode in which the piloting system controls said aircraft control parameter as a function of the setpoint generated by the control system; and
- a second mode in which the piloting system controls said aircraft control parameter at least as a function of a setpoint generated by the autopilot device.

Preferably, when the second mode is activated, the piloting system controls the aircraft control parameter as a function of the setpoint generated by the control system when the setpoint has an amplitude greater than the amplitude of the setpoint generated by the autopilot device and when these two setpoints are of the same sign.

This allows the pilot to override a control originating from the autopilot device: the autopilot device thus generates a setpoint corresponding to a minimum amplitude used for the control of the aircraft; if the pilot acts on the control system in such a way that the latter generates a setpoint of the same sign and of amplitude greater than the amplitude of the setpoint generated by the autopilot device, then the setpoint generated by the control system is used for the control of the aircraft.

The invention also concerns an aircraft including a control system as mentioned above.

The invention also concerns an aircraft including a piloting system as mentioned above.

The invention also relates to a method for controlling a parameter of an aircraft, including a step of determining a current position of a mobile element of a control interface, said mobile element being configured to move on a travel, said travel defining at least two portions of travel separated by a neutral position and the mobile element being brought back to said neutral position by a return element when it is not actuated. This method is noteworthy in that it furthermore includes the following steps:
- memorization, by a control unit, of an item of information corresponding to a first position of the mobile element on activation of an interaction element of the control interface;
- generation, by the control unit, of a setpoint of said aircraft control parameter, said setpoint being generated as a function of a control associated:
  - with said first position of the mobile element for which said information has been memorized upon activation of the interaction element; or
  - with a current position of the mobile element, when this current position and the first position are situated on the same portion of travel and this current position is more remote from the neutral position than the first position is remote from the neutral position.

In a particular embodiment, said control parameter is consistent with the derivative of the aircraft energy and said at least two portions of travel are associated with at least two combinations of actuators acting on the aircraft energy.

Preferably, the control unit is configured to control the display, on a display device, of at least a first indication corresponding to the current position of the mobile element and of a second indication corresponding to the first position of the mobile element.

Advantageously, the control unit is configured to control, furthermore, the display on the display device of a third indication corresponding to a current value of the aircraft control parameter, this third indication being displayed relative to said first and second indications.

The invention also concerns a method for piloting an aircraft, said aircraft including an autopilot device as well as a control system as mentioned above, said piloting system being able to be configured at least in:
- a first mode in which the piloting system controls said aircraft control parameter as a function of the setpoint generated by the control system; and
- a second mode in which the piloting system controls said aircraft control parameter at least as a function of a setpoint generated by the autopilot device.

This method includes the following steps when the second mode of the piloting system is activated:
- generation, by the control system, of a control setpoint of the aircraft control parameter, in accordance with the aforementioned method;
- control, by the piloting system, of the aircraft control parameter as a function;
  - of the setpoint generated by the control system when the setpoint has an amplitude greater than the amplitude of the setpoint generated by the autopilot device and when these two setpoints are of the same sign; or
  - of the setpoint generated by the autopilot device in the other cases.

The invention also relates to a computer program including instructions for the implementation of a method as mentioned above.

BRIEF DESCRIPTION OF THE DRAWINGS

The invention will be better understood on reading the following description and on examining the appended figures.

DETAILED DESCRIPTION

Figure 1:
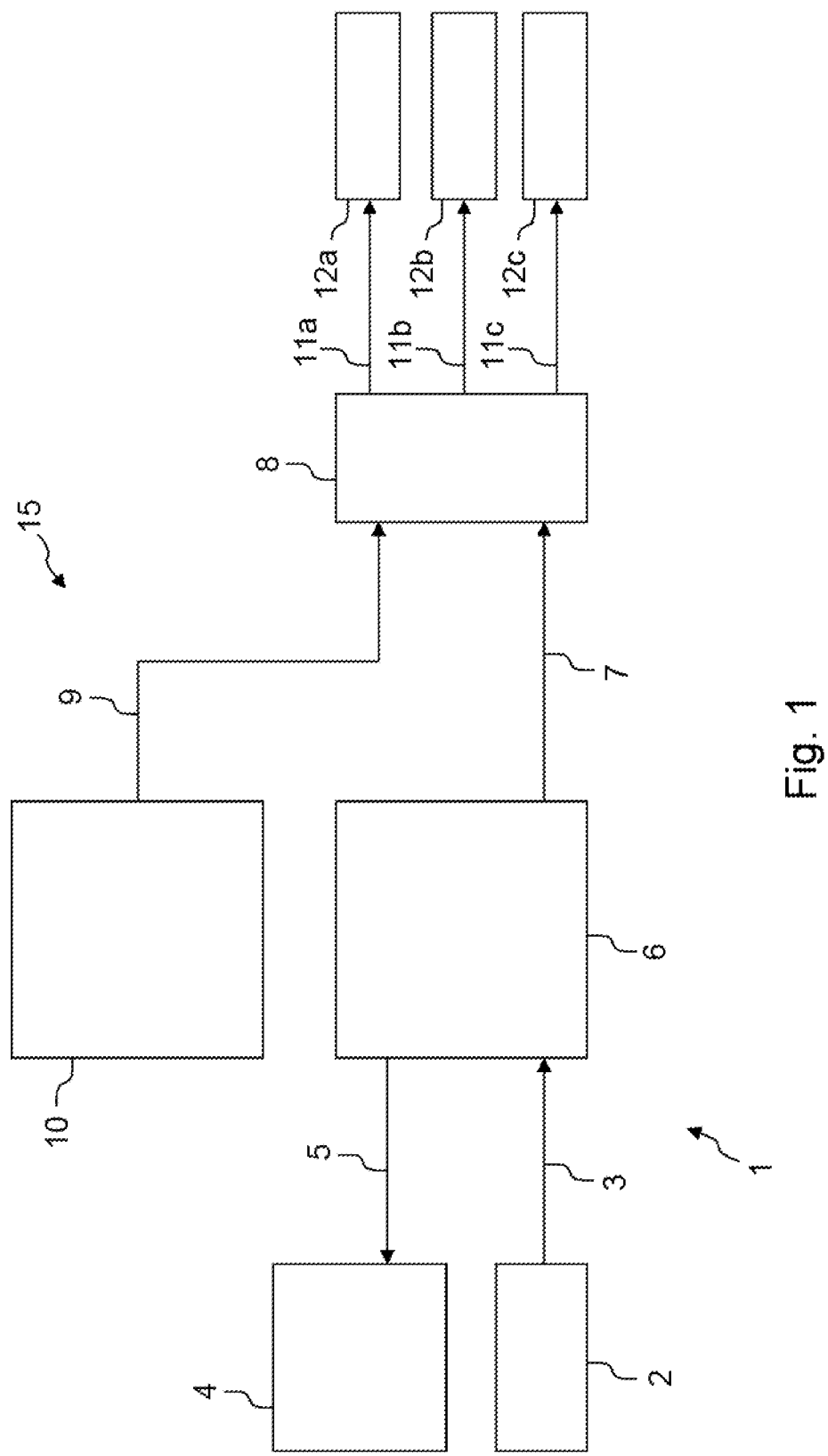
FIG. 1 shows, in a block diagram, an aircraft piloting system in accordance with an embodiment of the invention.

The piloting system 15 shown in FIG. 1 includes a device 10 for automatic piloting of the aircraft, as well as a system 1 for controlling an aircraft control parameter. The system 1 for controlling an aircraft control parameter comprises a control interface 2, a control unit 6 and a display device 4. The control interface 2 is linked to the control unit 6 by a link 3 and the control unit 6 is linked to the display device 4 by a link 5. The aircraft autopilot device 10 and the control system 1 of a control parameter are linked to a unit 8 for controlling the actuators by respective links 9 and 7. The actuator control unit 8 controls a set of actuators 12a, 12b, 12c by links 11a, 11b and 11c respectively.

Figure 2:
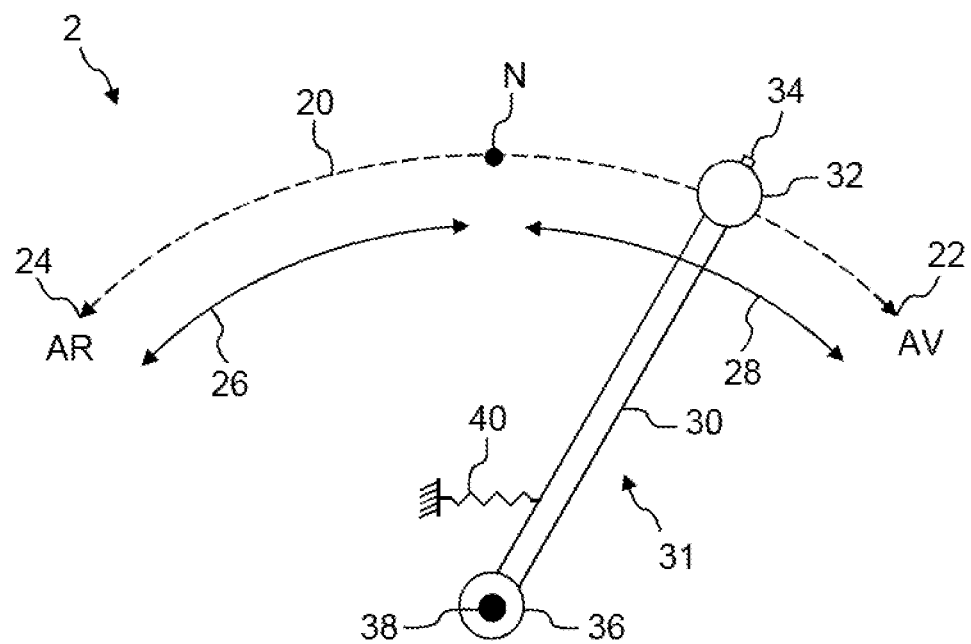
FIG. 2 shows, schematically, an example of a control interface in accordance with an embodiment of the invention.

An exemplary embodiment of the control interface 2 is shown in FIG. 2. The control interface 2 includes a mobile element 31 including a lever 30 equipped at its free end with a handle 32. Another end 36 of the lever 30 is mobile in rotation around an axis 38 orthogonal to the plane of the figure. This rotation enables a movement of the mobile element, corresponding to a travel 20 of the handle 32 between an extreme back position 24 (AR) and an extreme front position 22 (AV). This travel defines two portions of travel 26 and 28 separated by a neutral position N. A return element 40, for example a spring, makes it possible to bring back the mobile element 31 to the neutral position N when said mobile element is not actuated. The mobile element includes an interaction element 34, for example a push-button arranged on the handle 32.

The control system 1 and the piloting system 15 have as objective the control of an aircraft control parameter. This control parameter can be consistent with the derivative of the aircraft energy. It can also correspond to an angle of roll, an angle of pitch etc. The remainder of the description relates to the particular case in which the control parameter is consistent with the derivative of the aircraft energy. Those skilled in the art could without effort transpose this description to other parameters without departing from the context of the invention. By aircraft energy is meant the sum of its kinetic energy and of its potential energy. The energy of an aircraft can typically be controlled by acting on the engine thrust and/or on the configuration of the control surfaces such as airbrakes, when the aircraft is in flight, or by acting on the thrust of the engines, the brakes, the thrust reversers and/or the control surfaces such as the airbrakes when the aircraft is on the ground.

In the absence of a user action on the mobile element 31, this mobile element remains in a rest position corresponding to the neutral position N. When a user, in particular a pilot of the aircraft, actuates the mobile element to control a variation of the aircraft energy, this has the effect of displacing the mobile element along the travel 20. For example, when the pilot desires to increase the aircraft energy, he displaces the mobile element along the portion of travel 28, to a position situated between the neutral position N and the extreme front position 22. When the pilot desires to decrease the aircraft energy, he displaces the mobile element along the portion of travel 26, to a position situated between the neutral position N and the extreme back position 24. A setpoint value of the control parameter corresponds to a position of the mobile element along the travel 20.

The two portions of travel 26 and 28 are associated with at least two combinations of actuators acting on the aircraft energy. Thus, with the portion of travel 28 is associated a control of the thrust of the aircraft engines, which makes it possible to increase the aircraft energy. With each position of the mobile element 31 along the portion of travel 28 is associated a setpoint of thrust of the various engines. Similarly, with the portion of travel 26 is associated a control making it possible to decrease the aircraft energy. When the aircraft is in flight, this control corresponds to a control of the airbrakes. When the aircraft is on the ground, this control corresponds to a control of the brakes of the wheels of the aircraft or to a control in combination of the airbrakes and of the wheel brakes. With each position of the mobile element 31 along the portion of travel 26 is associated a setpoint relating to the airbrakes and/or to the brakes of the wheels as a function of the flight phase of the aircraft, notably according to whether the aircraft is in flight or on the ground.

The control unit 6 is configured to memorize an item of information corresponding to a first position of the mobile element 31 at an instant of activation of the interaction element 34. The control unit 6 is also configured to generate a setpoint related to the aircraft energy. When the current position of the mobile element 31 and the first position are situated on the same portion of travel 26 or 28 and this current position is more remote from the neutral position N than the first position is remote from the neutral position N, the setpoint is generated by the control unit 6 as a function of a control associated with said current position. Otherwise, the setpoint is generated as a function of a control associated with the first position for which said item of information has been memorized.

Preferably, on starting up the system, the interaction element 34 not having been activated yet by an operator of the aircraft, the first position corresponds to the neutral position N.

Figure 3A:
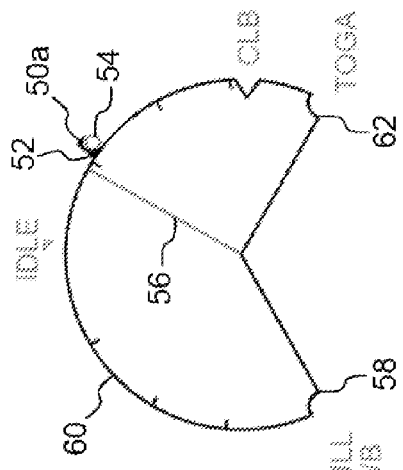

When a pilot desires to control a variation of the aircraft energy, he handles the mobile element 31 of the control interface 2. FIGS. 3a to 3f illustrate successive displays controlled by the control unit 6, on the display device 4, for a situation in which a pilot desires to increase the aircraft energy. As previously indicated, when the pilot wishes to increase the aircraft energy, he can displace the mobile element 31 along the portion of travel 28, with which a control of the aircraft's engine thrust is associated. FIG. 3a illustrates the case in which, in the absence of action of the pilot, the mobile element is in the rest position in the neutral position N and in which the interaction element 34 has not yet been activated. The display shown in this figure comprises a scale 60 of variation of the aircraft energy. This scale 60 includes a value denoted IDLE corresponding to a thrust value associated with the idling revs of the aircraft engines. The thrust setpoint associated with the neutral position N corresponds to this value IDLE. The display also includes a value denoted TOGA corresponding to the maximum thrust of the aircraft engines. This value TOGA is displayed substantially facing a first end 62 of the scale 60. The control unit 6 controls the display of a first indication 50a corresponding to the current position of the mobile element. When the mobile element is at rest in the neutral position N, the first indication 50a is displayed on the scale 60 facing said value IDLE, as shown in FIG. 3a. Advantageously, the control unit 6 furthermore controls the display of a third indication 54 corresponding to a current value of the aircraft control parameter, in this case the engine thrust setpoint. The mobile element 31 being in the neutral position N, this third indication is also displayed facing the value IDLE on the scale 60. Also advantageously, the display includes a fourth indication 56 corresponding to the current value of the engine thrust. In FIG. 3a, this fourth indication is also shown facing the value IDLE on the scale 60.

Figure 3B:
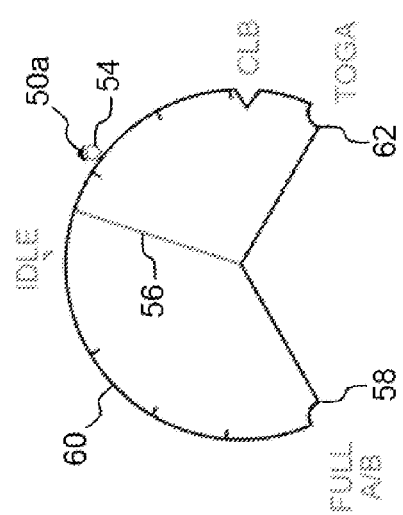
Figure 3C:
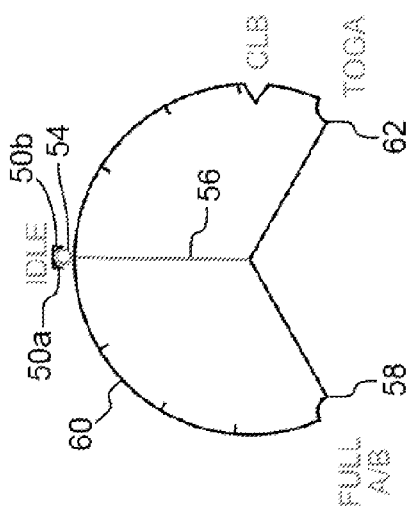
Figure 3D:
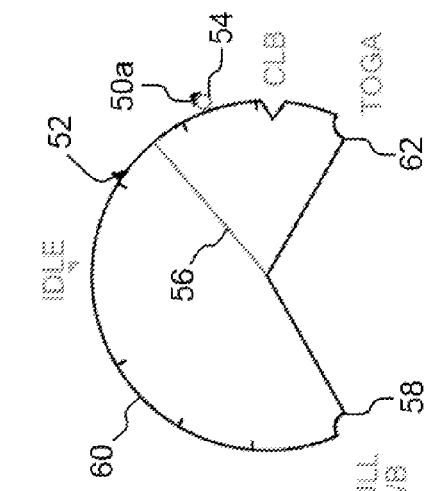
Figure 3E:
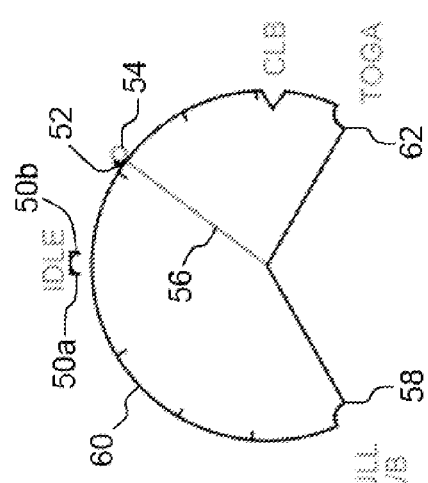
Figure 3F:
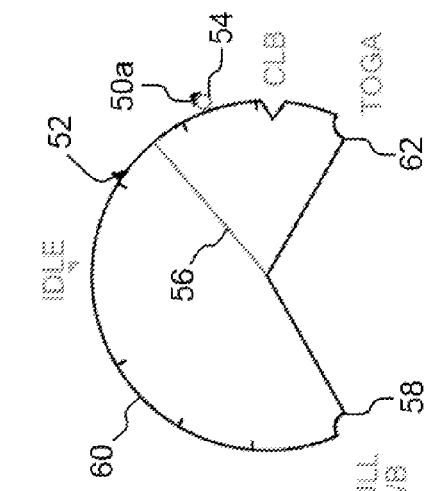

The display controlled by the control unit 6 on the display device 4 evolves as a function notably of the displacements, by the pilot, of the mobile element 31 on the portion of travel 28. The FIG. 3b shows a display corresponding to a position of the mobile element 31 on the portion of travel 28. This position of the mobile element will be called first position in the remainder of the description. The first indication 50a is then shown facing a value lying between IDLE and TOGA on the scale 60. The third indication 54 is also shown facing this value. Indeed, the pilot having not yet actuated the interaction element 34, the engine thrust setpoint is determined as a function of a control associated with the current position of the mobile element 31. Given the reaction time of the engines when a control is applied to them, the current value of the thrust, shown by the fourth indication 56, corresponds to a value situated between IDLE and said value associated with the third indication 54 on the scale 60. When the pilot actuates the interaction element 34 while the mobile element 31 is on said first position, the control unit 6 memorizes an item of information corresponding to this first position and controls the display of a second indication 52 corresponding to this first position, as shown in FIG. 3c. In accordance with the preceding description, when the current position of the mobile element 31 is situated on the portion of travel 28 and this current position is more remote from the neutral position N than the first position is remote from the neutral position N, the setpoint is generated by the control unit 6 as a function of a control associated with said current position. Otherwise, the setpoint is generated as a function of a control associated with said first position. Thus, while the pilot reduces his action on the mobile element 31, the latter approaches the neutral position N and the engine thrust setpoint is determined as a function of a control associated with said first position. The corresponding display is shown in FIG. 3*d*. The pilot can even release completely the mobile element 31, which comes back to the neutral position N under the effect of the return element 40. The engine thrust setpoint remains unchanged and the corresponding display is shown in FIG. 3*e*. This enables the pilot to release the mobile element 31 once he has actuated the interaction element 34 at the first position corresponding to the desired setpoint for the engine thrust. When the pilot then displaces the mobile element 31, on the portion of travel 28, to a current position more remote from the neutral position N than the first position is remote from the neutral position N, the engine thrust setpoint is generated by the control unit 6 as a function of a control associated with said current position. The corresponding display is shown in FIG. 3*f*. The display of the second indication 52 remains unchanged, while the first indication 50*a* and the third indication 54 are displayed facing a value, on the scale 60, corresponding to the current position of the mobile element 31. Such a functionality enables the pilot to temporarily increase the thrust of the aircraft's engines. If he then releases the mobile element 31, the control unit 6 brings the engine thrust setpoint back to the value corresponding to the first position.

After having defined a value of the first position by actuating the interaction element 34, the pilot can at any moment modify this value by actuating the interaction element 34 again. The new value of the first position then corresponds to the current position of the mobile element 31 when the pilot actuates the interaction element 34 again. In the particular case where the pilot actuates the interaction element 34 again while the mobile element 31 is in the neutral position N, the value of the first position is reset, as it was during the start-up of the system.

When the pilot desires to decrease the aircraft energy, he can displace the mobile element 31 along the portion of travel 26, with which is associated a control making it possible to decrease the aircraft energy. When the aircraft is in flight, this control corresponds to a control of the airbrakes. When the aircraft is on the ground, this control corresponds to a control of the wheel brakes of the aircraft or to a control in combination of the airbrakes and of the wheel brakes. The scale 60 displayed on the display device 4 includes a second end 58. When the aircraft is in flight, the display also includes a value denoted FULL A/B as shown in the FIGS. 3*a* to 3*f*. This value FULL A/B, which is displayed substantially facing the second end 58 of the scale 60, corresponds to a full deployment of the airbrakes and therefore to a maximum reduction of the aircraft energy.

Figure 4:
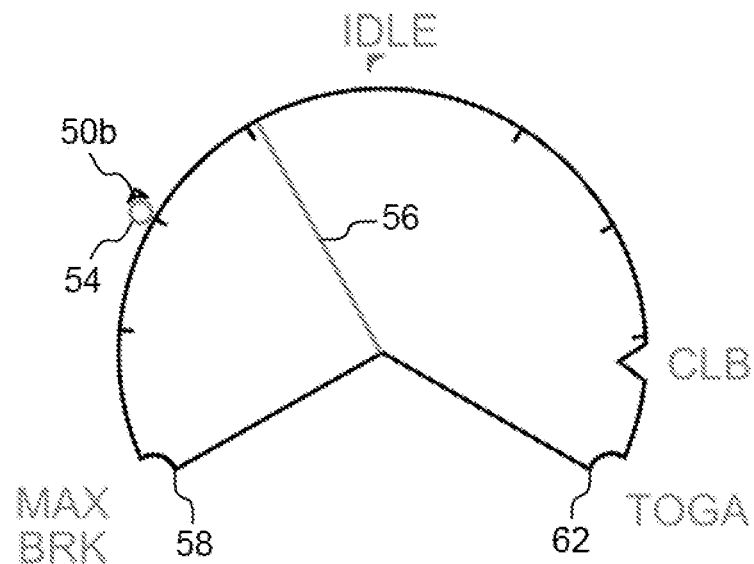
FIGS. 3a, 3b, 3c, 3d, 3e, 3f and 4 show examples of display on a screen of an aircraft according to a particular embodiment of the invention.

FIG. 4 illustrates the display on the display device 4 during braking, when the aircraft is on the ground. The display includes a value denoted MAX BRK, displayed substantially facing the second end 58 of the scale 60. This value MAX BRK corresponds to maximum braking of the aircraft. The control unit 6 controls the display of a first indication 50*b* corresponding to the current position of the mobile element 31 on the portion of travel 26. This first indication 50*b* is shown facing a value lying between IDLE and MAX BRK on the scale 60. The control unit 6 furthermore comprises the display of a third indication 54 corresponding to a current value of the aircraft control parameter, in this case a control of the brakes of the wheels of the aircraft or a control in combination of the airbrakes and of the wheel brakes. The display shown in FIG. 4 in the case of braking is similar to the display shown in FIG. 3*b* in the case of an engine thrust control. The display controlled by the control unit 6 in the case of braking will not be further described in detail to the extent that it is similar to the display controlled in the case of a control of the engine thrust, already described with reference to FIGS. 3*a* to 3*f*, with the difference that the various indications are displayed facing values lying between IDLE and MAX BRK on the scale 60.

When the pilot activates the interaction element 34, the memorized item of information corresponding to the first position of the mobile element 31 is, in a first variant, a value representing said first position. This value can be, for example, a percentage of the travel of the mobile element 31 corresponding to this first position or an angle corresponding to the deviation of the mobile element with respect to the neutral position N. In a second variant, the memorized item of information is a setpoint value of the aircraft control parameter, generated as a function of a control associated with said first position of the mobile element. For example, when the control parameter is consistent with the derivative of the aircraft energy and the pilot desires to increase the aircraft energy, the memorized item of information is a value of the setpoint of the engine thrust. This value can for example be expressed in the form of a percentage over an interval of thrust values lying between the values IDLE and TOGA.

Advantageously, the two portions of travel 26 and are associated with at least two combinations of actuators acting on the aircraft control parameter. Thus, when the control parameter is consistent with the derivative of the aircraft energy, a first combination of actuators comprising the various engines of the aircraft is associated with the portion of travel 28. A second combination of actuators is associated with the portion of travel 26. This second combination of actuators depends on the flight phase of the aircraft. When the aircraft is in flight, it comprises all or at least a sub-set of the various airbrakes of the aircraft. When the aircraft is on the ground, this second combination comprises all or a sub-set of the brakes of the wheels of the aircraft, and if necessary all or a sub-set of the various airbrakes of the aircraft. The control unit 6 computes a setpoint to be applied to the actuators of the combination of actuators corresponding to the portion of travel 26 or 28 on which the mobile element is situated, for the current flight phase of the aircraft. This setpoint is computed by the control unit 6 as a function of the first position of the mobile element 31 or of the current position of the mobile element 31 if the latter position is more remote from the neutral position N, as described previously. In one embodiment, the setpoint computed by the control unit 6 is a single setpoint applied in a uniform manner to each of the actuators of the combination under consideration. It is preferably expressed in the form of a percentage. To do this, the control unit 6 determines a setpoint of the control parameter and calculates a percentage that represents this setpoint with respect to a maximum setpoint value for this control parameter. For example, in the case of the thrust of the engines, this setpoint, which is single and uniform over all the engines is expressed in the form of a percentage of the maximum thrust TOGA. In another embodiment, the setpoint is not applied in a uniform manner over all the actuators. For example, the control unit 6 uses an allocation table containing setpoint values for each actuator of the combination under consideration, as a function either of the first position or of the current position of the mobile element 31, either of a value of the setpoint of the control parameter calculated as a function of the first position or of the current position of the mobile element 31. The fact of controlling a plurality of actuators with a single control interface 2 is advantageous, since it simplifies the piloting tasks for the pilot of the aircraft: the pilot thus controls all the actuators globally, without having to act on control interfaces associated with each of the actuators.

As indicated previously, apart from the control system 1 already described in detail, the piloting system 15 shown in FIG. 1 also includes an aircraft autopilot device 10. According to the aircraft control parameter under consideration, this autopilot device can for example correspond to a device of aircraft autopilot type or to an aircraft autothrust device. The piloting system 15 can be configured in at least two modes. In a first mode, the piloting system controls said aircraft control parameter as a function of the setpoint generated by the control system 1. In a second mode, the piloting system controls said aircraft control parameter at least as a function of a setpoint generated by the autopilot device 10. In a preferred manner, when this second mode is activated, the piloting system controls the aircraft control parameter as a function of the setpoint generated by the control system 1 when the setpoint has an amplitude greater than the amplitude of the setpoint generated by the autopilot device 10 and when these two setpoints are of the same sign. This operating mode allows the pilot of the aircraft to engage this second mode in which the control parameter is controlled automatically, without action of the pilot, by the autopilot device 10, while retaining an authority of the pilot over this autopilot device 10. Thus, when the second mode is engaged, the pilot can actuate the mobile element 31 of the control interface 2 while maintaining this second mode engaged; if the pilot displaces the mobile element 31 sufficiently that the setpoint generated by the control unit of the control system 1 is of the same sign and of an amplitude greater than the amplitude of the setpoint generated by the autopilot device 10, then the setpoint sent to the actuators by the piloting system 15 corresponds to the setpoint generated by the control unit 6 of the control system 1 as a function of the actions of the pilot on the mobile element 31. In this manner, if the pilot estimates that the amplitude of the setpoint generated by the autopilot 10 is insufficient, he can override the automatic control of the actuators by the autopilot device 10, by controlling a setpoint of greater amplitude by means of the mobile element 31 of the control interface 2. For example, if the pilot estimates that the engine thrust controlled automatically is insufficient, he can manually control a thrust of greater amplitude, by means of the mobile element 31 of the control interface 2.

The mobile element 31 of the control interface 2 being brought back automatically to the neutral position N when the pilot releases this mobile element, the piloting system 15 in accordance with the invention offers the advantage of not requiring any motorization of the mobile element in the second mode corresponding to an autopilot. Indeed, in the absence of action from the pilot, during automatic control of the actuators by the autopilot device 10, the mobile element 31 remains in the neutral position N, in the same way as in the first mode corresponding to non-automatic piloting. Preferably, when the second mode is activated, the third indication 54 corresponding to the current value of the aircraft control parameter, displayed on the display device 4, is displayed in accordance with the setpoint value of the control parameter actually applied to the actuators. As indicated previously, this setpoint value can be supplied by the control system 1 or by the autopilot device 10. This visual indication facilitates for the pilot the transition between the first and the second mode and vice versa.

The control unit 6, the autopilot device 10 and the unit 8 for controlling the actuators are shown in FIG. 1 in the form of three separate entities. However, this is a functional representation that is in no way limiting of the variant modes of hardware implementation possible without departing from the context of the invention. Thus, in a variant, these three entities can be implemented in one and the same computer, for example an aircraft flight control computer of FCS (Flight Control System) or FCGS (Flight Control and Guidance System) type, or else in an engine thrust control computer. In another variant, these three entities can be implemented in the form of software functionalities supported by computers of the modular avionics type communicating with each other by means of an avionics communication network, for example of AFDX (Avionics Full Duplex Switched Ethernet) type. The actuator control unit 8 can be common to several actuators or a control unit can be provided for each of the actuators.

In a particular embodiment, the interaction element 34 can be configured to block in position the mobile element 31 when this interaction element 34 is activated by the pilot.

The invention claimed is:

1. A system for controlling an aircraft control parameter, said control system comprising:
 a control interface including:
 a mobile element configured to move on a course, said course defining at least first and second portions of course separated by a neutral position;
 a return element configured to bring the mobile element back to said neutral position when said mobile element is not actuated; and
 an interaction element; and
 a control unit configured to:
 store in a memory an item of information corresponding to a first position of the mobile element at an instant of activation of the interaction element; and
 generate a setpoint of said aircraft control parameter, said setpoint being generated as a function of a control associated with
 a current position of the mobile element, when the current position and the first position are situated on the same portion of course and the current position is more remote from the neutral position than the first position is remote from the neutral position.

2. The system as claimed in claim 1, wherein said control parameter corresponds to a variation of the aircraft energy.

3. The system as claimed in claim 1, wherein said at least first and second portions of course are associated with at least first and second combinations of actuators acting on said aircraft control parameter.

4. The system as claimed in claim 1, further comprising a display device, wherein the control unit is configured to control display on the display device, of at least a first indication corresponding to the current position of the mobile element and of a second indication corresponding to the first position of the mobile element.

5. The system as claimed in claim 4, wherein the control unit is configured to control, furthermore, display on the display device of a third indication corresponding to a current value of the aircraft control parameter, the third indication being displayed relative to said first and second indications.

6. The system as claimed in claim 1, wherein the memorized information corresponding to the first position of the mobile element at an instant of activation of the interaction element is:
- a value representing said first position; or
- a setpoint value of the aircraft control parameter generated as a function of a control associated with said first position of the mobile element.

7. The system as claimed in claim 1, wherein the interaction element is configured to block the mobile element in position.

8. An aircraft piloting system including:
an aircraft autopilot device; and
a control system comprising:
a control interface including:
a mobile element configured to move on a course, said course defining at least first and second portions of course separated by a neutral position;
a return element configured to bring the mobile element back to said neutral position when said mobile element is not actuated; and
an interaction element; and
a control unit configured to:
store in a memory an item of information corresponding to a first position of the mobile element at an instant of activation of the interaction element; and
generate a setpoint of said aircraft control parameter, said setpoint being generated as a function of a control associated with
a current position of the mobile element, when the current position and the first position are situated on the same portion of course and the current position is more remote from the neutral position than the first position is remote from the neutral position,
said piloting system configured at least according to:
a first mode in which the piloting system controls said aircraft control parameter as a function of the setpoint generated by the control system; and
a second mode in which the piloting system controls said aircraft control parameter at least as a function of a setpoint generated by the autopilot device.

9. The piloting system as claimed in claim 8, wherein when the second mode is activated, the piloting system controls the aircraft control parameter as a function of the setpoint generated by the control system when the setpoint has an amplitude greater than the amplitude of the setpoint generated by the autopilot device and when the two setpoints are of the same sign.

10. A method for controlling a parameter of an aircraft, the method comprising:
determining a current position of a mobile element of a control interface, said mobile element being configured to move on a course, said course defining at least first and second portions of course separated by a neutral position and the mobile element being brought back to said neutral position by a return element when the mobile element is not actuated;
storing in a memory, by a control unit, of an item of information corresponding to a first position of the mobile element on activation of an interaction element of the control interface;
generating, by the control unit, of a setpoint of said aircraft control parameter, said setpoint being generated as a function of a control associated
with a current position of the mobile element, when this current position and the first position are situated on the same portion of course and this current position is more remote from the neutral position than the first position is remote from the neutral position.

11. The method as claimed in claim 10, wherein said control parameter is consistent with the derivative of the aircraft energy and said at least first and second portions of travel are associated with at least first and second combinations of actuators acting on the aircraft energy.

12. The method as claimed in claim 10, wherein the control unit is configured to control display on a display device, of at least a first indication corresponding to the current position of the mobile element and of a second indication corresponding to the first position of the mobile element.

13. The method as claimed in claim 12, wherein the control unit is configured to control display on the display device of a third indication corresponding to a current value of the aircraft control parameter, the third indication being displayed relative to said first and second indications.

\* \* \* \* \*